United States Patent
Lee et al.

(10) Patent No.: US 9,769,222 B2
(45) Date of Patent: Sep. 19, 2017

(54) METHOD AND APPARATUS FOR PROVIDING ARS SERVICE

(71) Applicant: Samsung Electronics Co., Ltd, Gyeonggi-do (KR)

(72) Inventors: Jaeduck Lee, Seoul (KR); Dohyoung Kim, Gyeonggi-do (KR); Hyunjeong Lee, Gyeonggi-do (KR); Kiho Cho, Gyeonggi-do (KR); Jungchul Kim, Seoul (KR); Yesul Ha, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/030,368

(22) PCT Filed: Oct. 15, 2014

(86) PCT No.: PCT/KR2014/009683
§ 371 (c)(1),
(2) Date: Apr. 18, 2016

(87) PCT Pub. No.: WO2015/056976
PCT Pub. Date: Apr. 23, 2015

(65) Prior Publication Data
US 2016/0261652 A1     Sep. 8, 2016

(30) Foreign Application Priority Data

Oct. 16, 2013    (KR) .................. 10-2013-0123569

(51) Int. Cl.
*H04N 7/15*     (2006.01)
*H04L 29/06*     (2006.01)
(Continued)

(52) U.S. Cl.
CPC ...... *H04L 65/1096* (2013.01); *H04L 65/1006* (2013.01); *H04L 65/1016* (2013.01);
(Continued)

(58) Field of Classification Search
CPC ..................................................... H04M 3/493
See application file for complete search history.

(56) References Cited

U.S. PATENT DOCUMENTS 5,802,526 A *   9/1998   Fawcett .................. G06F 3/167
                                                             348/14.06
8,600,018 B2 *   12/2013   Gao ........................ G06F 3/016
                                                             235/462.01
(Continued)

FOREIGN PATENT DOCUMENTS

JP        2007-173935      7/2007
KR    10-2009-0116925    11/2009
(Continued)

OTHER PUBLICATIONS

International Search Report dated Jan. 26, 2015 in connection with International Patent Application No. PCT/KR2014/009863, 5 pages.
(Continued)

*Primary Examiner* — Creighton Smith

(57) ABSTRACT

A method for providing a composite voice-screen automatic response system (ARS) service, according to one embodiment of the present invention, comprises: a step for receiving, by a server for a multimedia call, a call request message from user equipment; a step for determining whether the server for the multimedia call possesses ARS contents corresponding to a call number of the call request message; a step for transmitting, by the server for the multimedia call, a command for downloading the ARS contents to the user equipment when it is determined that the server for the multimedia call possesses the ARS contents; and a step for transmitting, by the server for the multimedia call, the call
(Continued)

request message to the call number, wherein the user equipment can receive an ARS service synchronized with a voice and a screen without installing an application according to each enterprise for providing the ARS service.

18 Claims, 7 Drawing Sheets

(51) Int. Cl.
    *H04M 3/493*     (2006.01)
    *H04L 29/08*     (2006.01)
    *H04M 3/42*     (2006.01)
    *H04N 7/14*     (2006.01)

(52) U.S. Cl.
    CPC .............. *H04L 67/02* (2013.01); *H04L 67/06* (2013.01); *H04M 3/42102* (2013.01); *H04M 3/493* (2013.01); *H04N 7/147* (2013.01)

(56) References Cited

U.S. PATENT DOCUMENTS

| | | | | |
|---|---|---|---|---|
| 2004/0120479 | A1* | 6/2004 | Creamer | H04M 3/493 379/88.22 |
| 2004/0209677 | A1* | 10/2004 | Park | G06Q 20/32 463/29 |
| 2007/0232222 | A1* | 10/2007 | de Jong | H04N 21/23406 455/3.06 |
| 2010/0042411 | A1* | 2/2010 | Addessi | G10L 13/00 704/270 |
| 2011/0237308 | A1* | 9/2011 | Jung | H04L 67/36 455/566 |
| 2013/0138443 | A1* | 5/2013 | Kim | H04M 1/2535 704/270.1 |
| 2013/0217368 | A1* | 8/2013 | Kim | H04M 3/51 455/414.1 |
| 2014/0223024 | A1* | 8/2014 | Wogsberg | H04N 7/181 709/231 |
| 2017/0026989 | A1* | 1/2017 | Mang | H04W 72/1242 |

FOREIGN PATENT DOCUMENTS

| | | |
|---|---|---|
| KR | 10-2011-0070386 | 6/2011 |
| KR | 10-2012-0025364 | 3/2012 |
| KR | 10-2013-0015195 | 2/2013 |

OTHER PUBLICATIONS

Written Opinion of the International Searching Authority dated Jan. 26, 2015 in connection with International Patent Application No. PCT/KR2014/009683, 8 pages.

* cited by examiner

METHOD AND APPARATUS FOR PROVIDING ARS SERVICE

CROSS-REFERENCE TO RELATED APPLICATION(S)

The present application claims priority under 35 U.S.C. §365 to International Patent Application No. PCT/KR2014/009683 filed Oct. 15, 2014, entitled "METHOD AND APPARATUS FOR PROVIDING ARS SERVICE", and, through International Patent Application No. PCT/KR2014/009683, to Korean Patent Application No. 10-2013-0123569 filed Oct. 16, 2013, each of which are incorporated herein by reference into the present disclosure as if fully set forth herein.

TECHNICAL FIELD

The present invention relates to Automatic Response System (ARS) services, and more particularly, to a method and apparatus for providing a voice-screen composite Automatic Response System (ARS) service that provides user equipment (UE) with an image menu on the screen along with a voice ARS.

BACKGROUND ART

Voice-screen composite Automatic Response System (ARS) services are in general provided by the following two methods. One method provides the service in such a way that, when a user attempts to make a video call to a particular ARS number, ARS menus via a voice message are output to the user and simultaneously a message with a video screen is output while the voice message is output. Therefore, the user can read menus displayed on the screen while hearing a voice message.

Another method provides the service in such a way that, in a state where a user downloads and installs, to his/her user equipment (UE), an application for a voice-screen composite ARS service developed by an ARS service provider, when the user makes a call to the ARS service provider, the application on the screen of the UE is executed along with a voice ARS.

DISCLOSURE OF INVENTION

Technical Problem

The method of providing a voice-screen composite ARS service via a video call is disadvantageous due to the high charges for video calls. The method of providing a voice-screen composite ARS service via an application for an ARS service downloaded from an ARS service providing company is disadvantageous because it needs to install applications corresponding to individual ARS service providers, respectively.

The present invention has been made to address the above problems and disadvantages, and to provide at least the advantages described below. Accordingly, the present invention provides a method and apparatus for allowing mobile communication subscribers to connect to one ARS of the ARS service providers that differ from each other, without installing a number of corresponding applications, and to receive voice-screen ARS services.

Solution to Problem

In accordance with an aspect of the present invention, the present invention provides a method of providing a voice-screen composite Automatic Response System (ARS) service by a server for multimedia call (multimedia call server) located in an IP Multimedia Subsystem (IMS) network. The method includes: receiving, by the multimedia call server, a call request message from user equipment (a terminal); determining, by the multimedia call server, whether it has ARS content corresponding to a phone number of the call request message; instructing, by the multimedia call server, the UE to download the ARS content when it has ARS content corresponding to a phone number of the call request message; and transmitting, by the multimedia call server, the call request message via the phone number.

In accordance with another aspect of the present invention, the present invention provides a server for multimedia call (multimedia call server), located in an IP Multimedia Subsystem (IMS) network, for provide a voice-screen composite Automatic Response System (ARS) service. The multimedia call server includes: a communication unit for receiving a call request message from user equipment (a terminal) and transmitting the call request message to a phone number of the call request message; a storage unit for storing ARS content therein; and a controller for determining whether ARS content corresponding to the phone number of the call request message is stored in the storage unit; and controlling the communication unit to instruct the UE to download the ARS content when ARS content corresponding to the phone number of the call request message is stored in the storage unit.

In accordance with another aspect of the present invention, the present invention provides a method of providing a voice-screen composite Automatic Response System (ARS) service. The method includes: transmitting, by equipment (UE) (a terminal), a call request message to use an ARS service; receiving, by the UE, an instruction for downloading ARS content from a server for multimedia call (multimedia call server) located in an IP Multimedia Subsystem (IMS) network; and connecting, by the UE, to the multimedia call server.

In accordance with another aspect of the present invention, the present invention provides a terminal (user equipment (UE)) for providing a voice-screen composite Automatic Response System (ARS) service. The UE includes: a communication unit for transmitting a call request message and receiving an instruction for downloading ARS content from a server for multimedia call (multimedia call server) located in an IP Multimedia Subsystem (IMS) network; and a controller for controlling, when receiving the instruction for downloading ARS content, the communication unit to connect to the multimedia call server.

Advantageous Effects of Invention

The present invention is capable of providing an ARS service synchronizing voice and screen to user equipment (UE), without requiring users to download and install, to the UE, applications according to ARS service providers.

MODE FOR THE INVENTION

Figure 1:
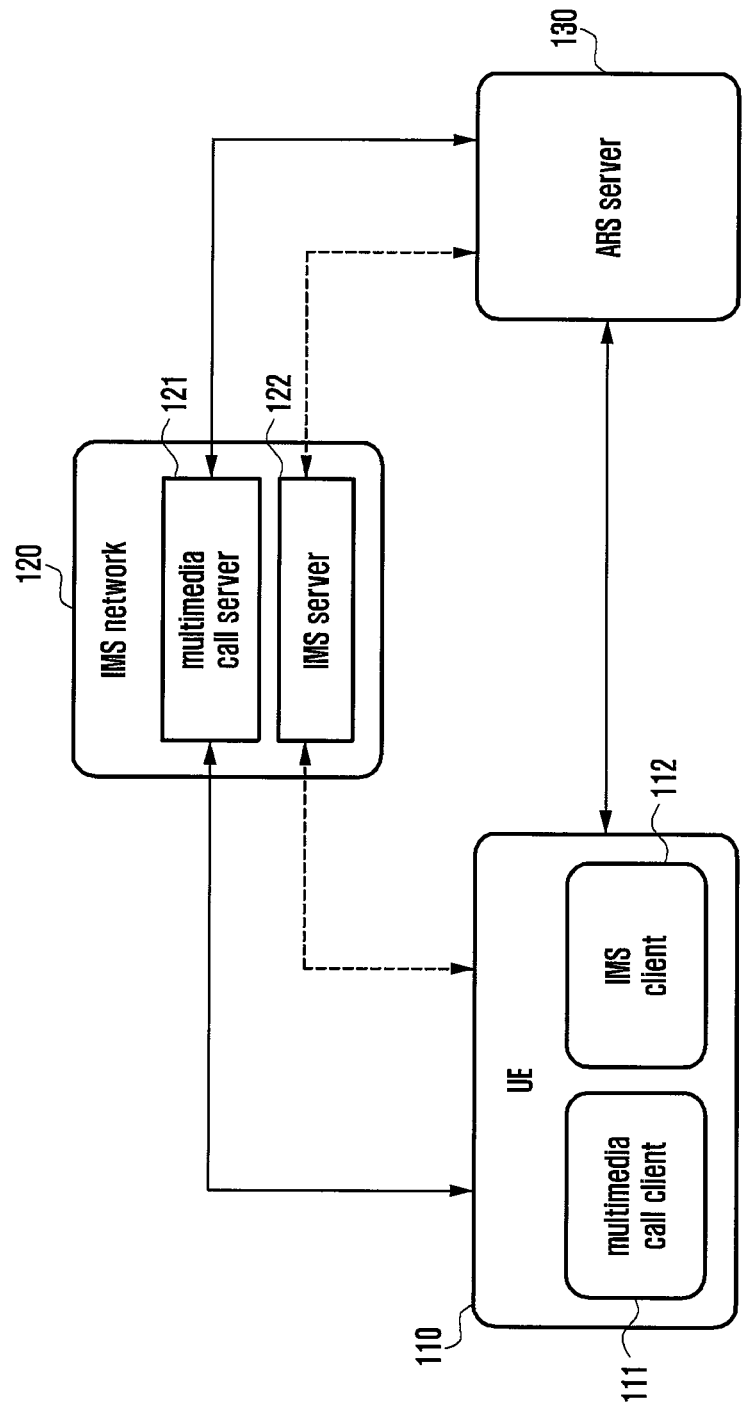
FIG. 1 is a block diagram showing the configuration of a voice-screen composite ARS system according to an embodiment of the present invention.

The terms or words described in the description and the claims should not be limited by a general or lexical meaning, instead should be analyzed as a meaning and a concept through which the inventor defines and describes the invention to the best of his/her ability, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

In the description and claims, the expressions such as "include," "comprise," and "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The singular forms are intended to include the plural forms as well, unless the context clearly indicates otherwise. For example, "an Automatic Response System (ARS) server" may denote one ARS server or two or more ARS servers. It should be understood that the term "~ module" or "~ unit" is used, for the sake of convenient description.

In the description and claims, "user equipment (UE) (terminal)" refers to an electronic device which includes a display with one or more touch screens and is capable of executing applications or displaying content thereon. Examples of UE are IP Multimedia Subsystem (IMS) are terminals, tablet Personal Computers (tablet PCs), Portable Multimedia Players (PMPs), Personal Digital Assistant (PDA), smartphones, smart devices, mobile phone, headphones, earphones, digital album, wearable devices, etc.

In the description and claims, the expression "voice-screen composite Automatic Response System (ARS)" refers to ARS which provides image menus on a screen along with voice ARS. The expression "voice-screen composite ARS" may also be called 'multimedia call.' The expression "ARS content" refers to information required for providing image menus on a screen. The expression "ARS content" may include ARS screen menus. The expression "server for multimedia call" refers to a server which is capable of receiving ARS content from one or more ARS servers, modifying the content and providing it to UE. The expression "server for multimedia call" may also be called an ARS content server or a Dialweb server, but is not limited thereto.

Embodiments of the present invention are described in detail referring to the accompanying drawings. Detailed descriptions of well-known functions and structures incorporated herein may be omitted to avoid obscuring the subject matter of the invention. It should be understood that the features of the present invention are not limited to the embodiments and the present disclosure should be construed to cover all modifications, equivalents, and/or alternatives falling within the spirit and scope of the present disclosure. Although the drawings represent an embodiment of the invention, the drawings are not necessarily to scale and certain features may be exaggerated or omitted in order to better illustrate and explain the invention. It should be understood that the invention is not limited to the drawing scale.

FIG. 1 is a block diagram showing the configuration of a voice-screen composite ARS system according to an embodiment of the present invention.

The voice-screen composite ARS system is capable of including UE 110, an IMS network 120, and an ARS server 130. UE 110 is capable of including a client 111 for multimedia call (multimedia call client) and an IMS client 112. The IMS network 120 refers to a network installed by a communication company and is capable of including a server 121 for multimedia call (multimedia call server) and an IMS server 122. The ARS server 130 refers to a server installed by a company which provides a voice-screen composite ARS service (a voice-screen composite ARS service provider) and is capable of including Interactive Voice Response (IVR).

The multimedia call client 111 is capable of communicating with the multimedia call server 121 and receiving ARS content therefrom. The multimedia call client 111 is capable of analyzing the received ARS content and outputting it on the screen of the UE 110. The ARS content received by the client 111 may include HyperText Markup Language (HTML)-based ARS menus. The multimedia call client 111 receives ARS voice information from the ARS server 130. The multimedia call client 111 is capable of synchronizing an HTML menu screen, corresponding to ARS voice information received from the ARS server 130, with the received ARS voice information, and outputting the synchronized result. The IMS client 112 connects to the IMS server 122 and is capable of performing IMS registration and a call processing.

The multimedia call server 121 is capable of receiving information related to ARS content from an ARS server 130 of each of companies for providing voice-screen composite ARS services, converting the ARS content into a corresponding form to be displayed via the UE 110, and storing it. The information related to ARS content may include ARS menus. The multimedia call server 121 is capable of cooperating with IMS equipment of a communication company, e.g., Call Session Control Function (CSCF). The multimedia call server 121 is capable of analyzing ARS menus provided by the ARS server 130 and converting it into menus of HTML format that the multimedia call client 111 can analyze. The multimedia call server 121 is capable of periodically accessing the ARS server 130 and thus synchronizing with the server 130 for information related to ARS content.

The IMS server 122 is capable of performing IMS registration for UE 110. When receiving a request for establishing an IMS call from the UE 110, the IMS server 122 is capable of forwarding the request to the ARS server 130.

The ARS server 130 provides an interface to transmit information regarding ARS content (including ARS menus of a company, etc.) to the multimedia call server 121. The ARS menus provided by the ARS server 130 may be written in Call Control XML (CC-XML) for voice call control or VoiceXML (VoXML) by using a Text-to-Speech module.

Figure 2:
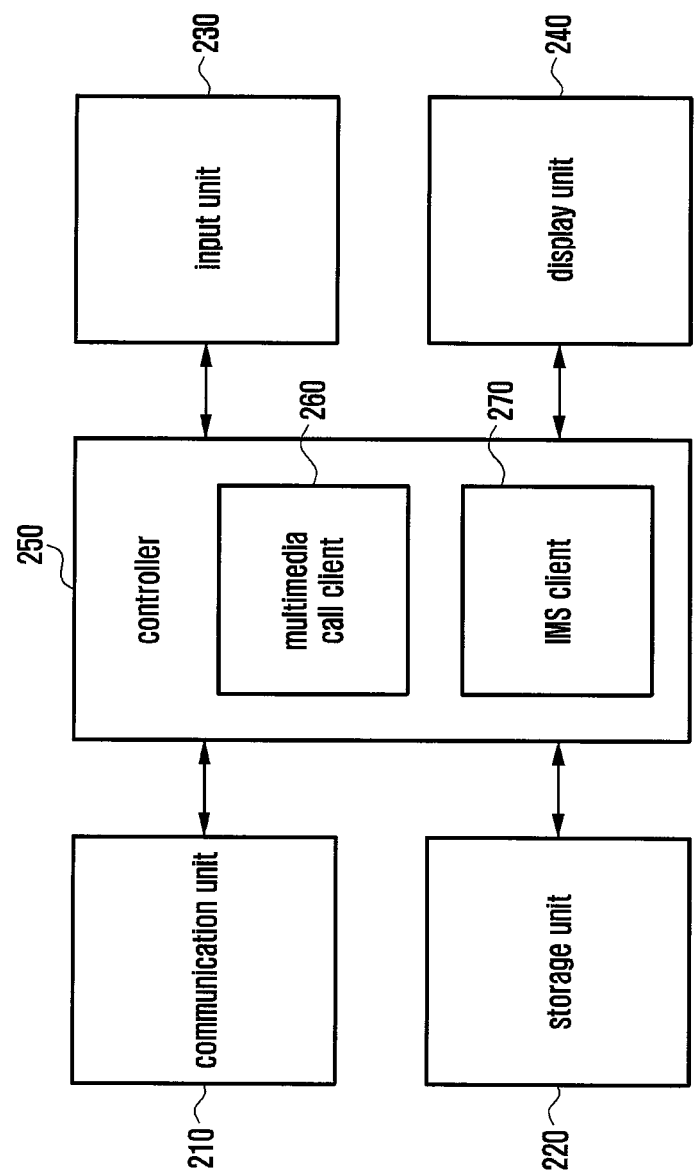
FIG. 2 is a block diagram showing the configuration of user equipment (UE) according to an embodiment of the present invention.

FIG. 2 is a block diagram showing the configuration of user equipment (UE) according to an embodiment of the present invention.

Referring to FIG. 2, UE 110 is capable of including a communication unit 210, a storage unit 220, an input unit 230, a display unit 230 and controller 250.

The communication unit 210 is capable of establishing communication channels for a voice/video call or data communication such as video or messages, under the control of the controller 250. UE 110 is capable of transmitting a call request message via the communication unit 210, and receiving a command for downloading ARS content from the multimedia call server in the IMS network 120. UE 110 is capable of receiving ARS voice information from the ARS server 130 providing ARS services, via the communication unit 210.

The storage unit 220 may include cache memory, D-RAM, S-RAM, flash memory, magnetic disk storage device, optical disk storage device, etc. The storage unit 220 is capable of storing ARS content received from the multimedia call server 121 and voice information received from the ARS server 130.

The input unit 230 is capable of receiving numerical or alphabetical information input by the user of the UE 110. The input unit 230 is capable of including a number of input keys and function keys to set various types of functions in the UE 110. The function keys include direction keys, side keys, shortcut keys, etc., which are set to perform specific functions. The input unit 230 is capable of including one or more of the following: a touch panel, a microphone, buttons, a mouse device, a remote controller, a jog wheel, a jog switch, etc.

The display unit 230 is capable of including Liquid Crystal Display (LCD), Light Emitting Diode (LED), Organic Light Emitted Diode (OLED), a speaker, headphones or earphones, etc. The display unit 230 is capable of outputting ARS content and voice information in synchronization, where the ARS content and voice information are received via the communication unit 210.

The controller 250 is implemented with a micro-processor or micro-computer, such as a Central Processing Unit (CPU), a Digital Signal Processing (DSP), etc. The controller 150 is capable of controlling the flow of signals to support a voice-screen composite ARS function of UE 110. For example, when receiving a command for downloading ARS content, the controller 250 is capable of controlling the communication unit 210 to connect to the multimedia call server 121. The multimedia call client 260 and the IMS client 270 correspond to the multimedia call client 111 and the IMS client 112 shown in FIG. 1. Although the embodiment of FIG. 2 is implemented in such a way that the multimedia call client 260 and the IMS client 270 are included in the controller 250, it should be understood that the present invention is not limited to the configuration.

Figure 3:
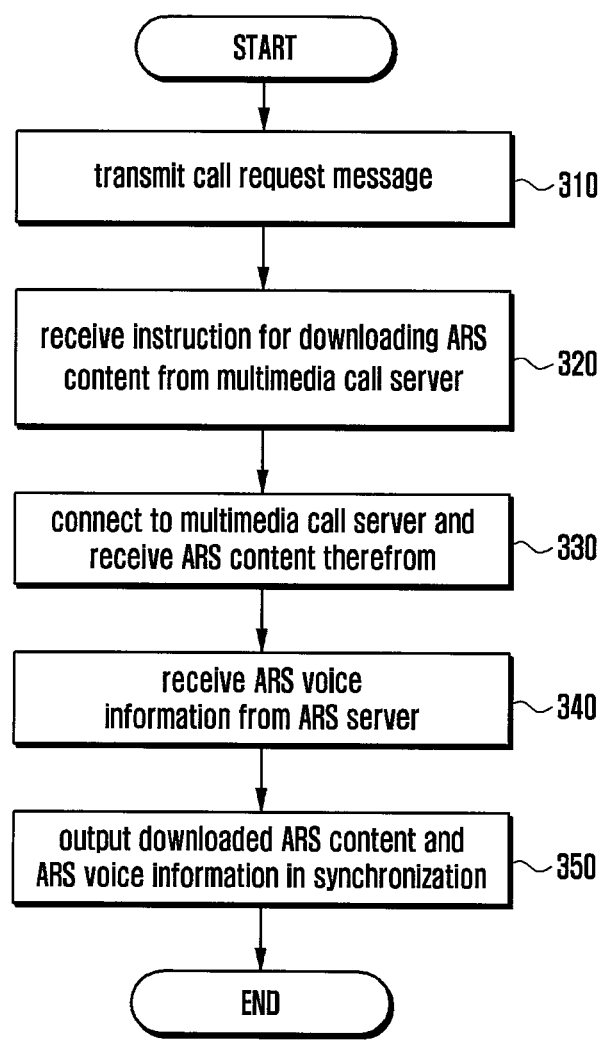
FIG. 3 is a flowchart that describes operations of user equipment (UE) according to an embodiment of the present invention.

FIG. 3 is a flowchart that describes operations of user equipment (UE) according to an embodiment of the present invention.

UE is capable of transmitting a call request message to use an ARS service in operation 310. The call request message may be transmitted to the multimedia call server in an IMS network. The UE is capable of receiving a command for downloading ARS content from the multimedia call server in operation 320. In this case, the UE connects to the multimedia call server and receives ARS content corresponding to the phone number of the call request message in operation 330. In addition to the process of downloading ARS content, the UE is capable of further receiving ARS voice information from the ARS sever in operation 340. The UE is capable of outputting the downloaded ARS content and the ARS voice information in synchronization in operation 350.

Figure 4:
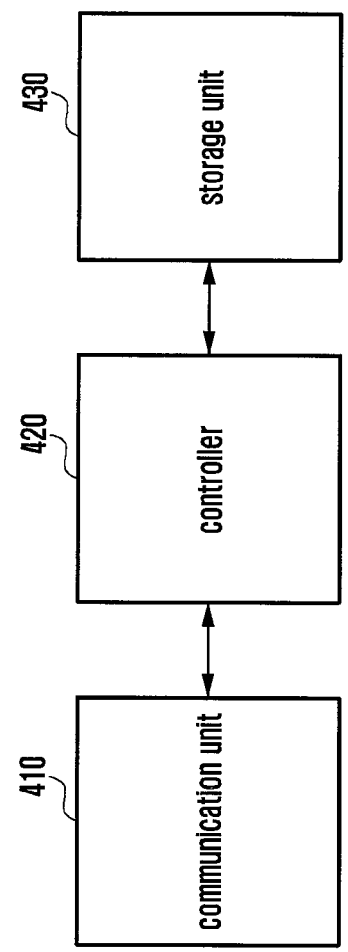
FIG. 4 is a block diagram showing the configuration of a server for multimedia call according to an embodiment of the present invention.

FIG. 4 is a block diagram showing the configuration of a server for multimedia call (multimedia call server) according to an embodiment of the present invention.

Referring to FIG. 4, the multimedia call server 121 is capable of including a communication unit 410, a controller 420 and a storage unit 430.

The communication unit 410 is capable of establishing communication channels for data communication, with UE 110 or an ARS server 130, under the control of the controller 420. For example, the multimedia call server 121 is capable of receiving a call request message from UE, via the communication unit 410 and transmitting the call request message to a phone number of the call request message.

The controller 420 is implemented with a micro-processor or micro-computer, such as a Central Processing Unit (CPU), a Digital Signal Processing (DSP), etc. The controller 420 is capable of controlling the flow of signals for transmission/reception, analysis and storage of data of the multimedia call server 121. For example, the controller 420 is capable of determining whether ARS content corresponding to a phone number of the call request message is stored in the storage unit 430, and controlling, when ascertaining that ARS content is stored in the storage unit 430, the communication unit 410 to transmit a command for downloading ARS content to the UE 110. For example, when the controller 420 ascertains that ARS content is not stored in the storage unit 430, it is capable of controlling the communication unit 410 to request information related to ARS content from the ARS server 130.

The storage unit 430 may include cache memory, D-RAM, S-RAM, flash memory, magnetic disk storage device, optical disk storage device, etc. When the communication unit 410 receives information related to ARS content from the ARS server, the storage unit 430 is capable of converting the received ARS content into a form which can be displayed via the UE and storing the converted result therein. The controller 420 is capable of converting information regarding ARS menu configuration, transmitted from the ARS server via the communication unit 410, into a format which can be display via an HTML browser, and providing the converted result to the UE. In this case, the UE has the HTML browser installed therein and is capable of outputting an ARS screen employing a normal HTML format, regardless of the configuration of ARS menus provided by ARS servers.

Figure 5:
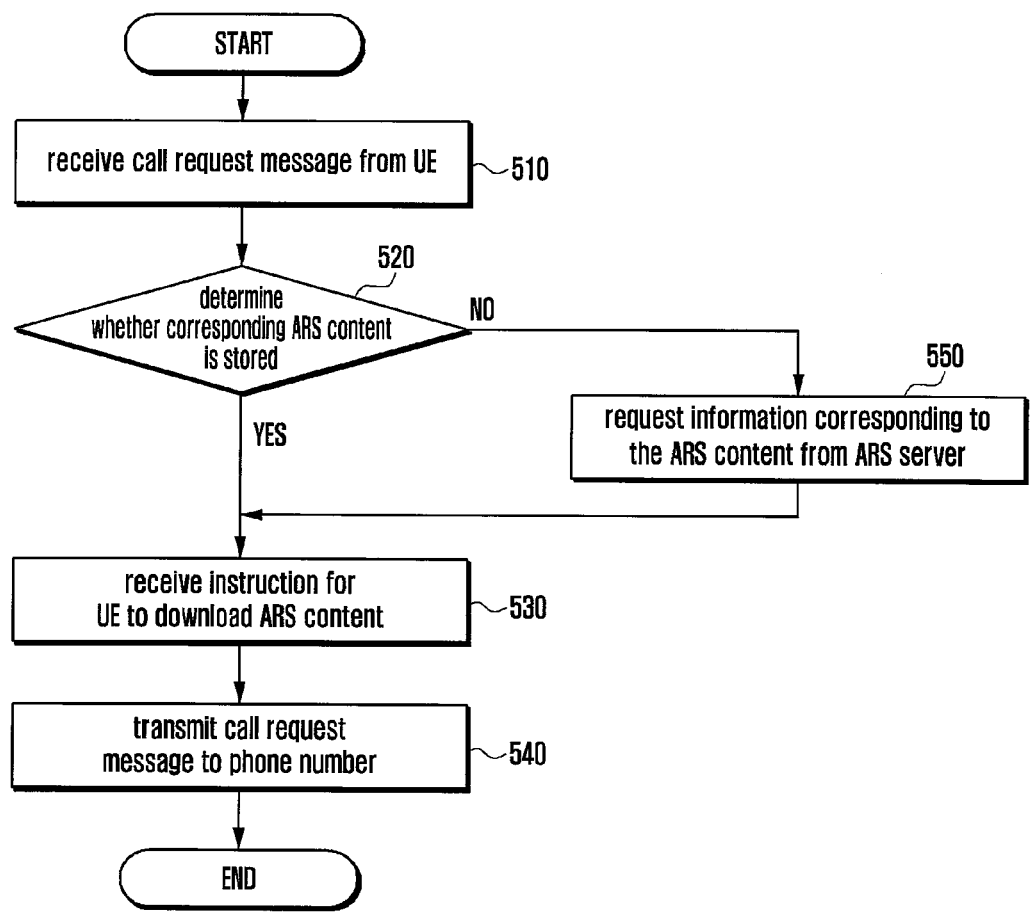
FIG. 5 is a flowchart that describes operations of a server for multimedia call according to an embodiment of the present invention.

FIG. 5 is a flowchart that describes operations of a server for multimedia call (multimedia call server) according to an embodiment of the present invention.

The multimedia call server is capable of receiving a call request message from UE in operation 510. After receiving the call request message, the multimedia call server is capable of determining whether ARS content corresponding to a phone number of the call request message is stored in the storage unit 430 in operation 520. When the multimedia call server ascertains that ARS content is not stored in the storage unit 430 in operation 520, it is capable of requesting information corresponding to the ARS content from the ARS server 130 in operation 550. When the multimedia call server receives the information regarding the requested ARS content from the ARS server, it is capable of performing conversion of the received ARS content and storing the converted result in the storage unit 430. When the multimedia call server ascertains that the ARS content is stored in the storage unit 430 in operation 520, or receives information regarding ARS content from the ARS server 130, performs the conversion of the received ARS content and stores the converted result in the storage unit 430 in operation 550, it is capable of instructing UE to download the ARS content in operation 530. The multimedia call server is capable of transmitting a call request message to a phone number of the call, regardless of whether ARS content is stored in the storage unit 430 in operation 540.

Figure 6:
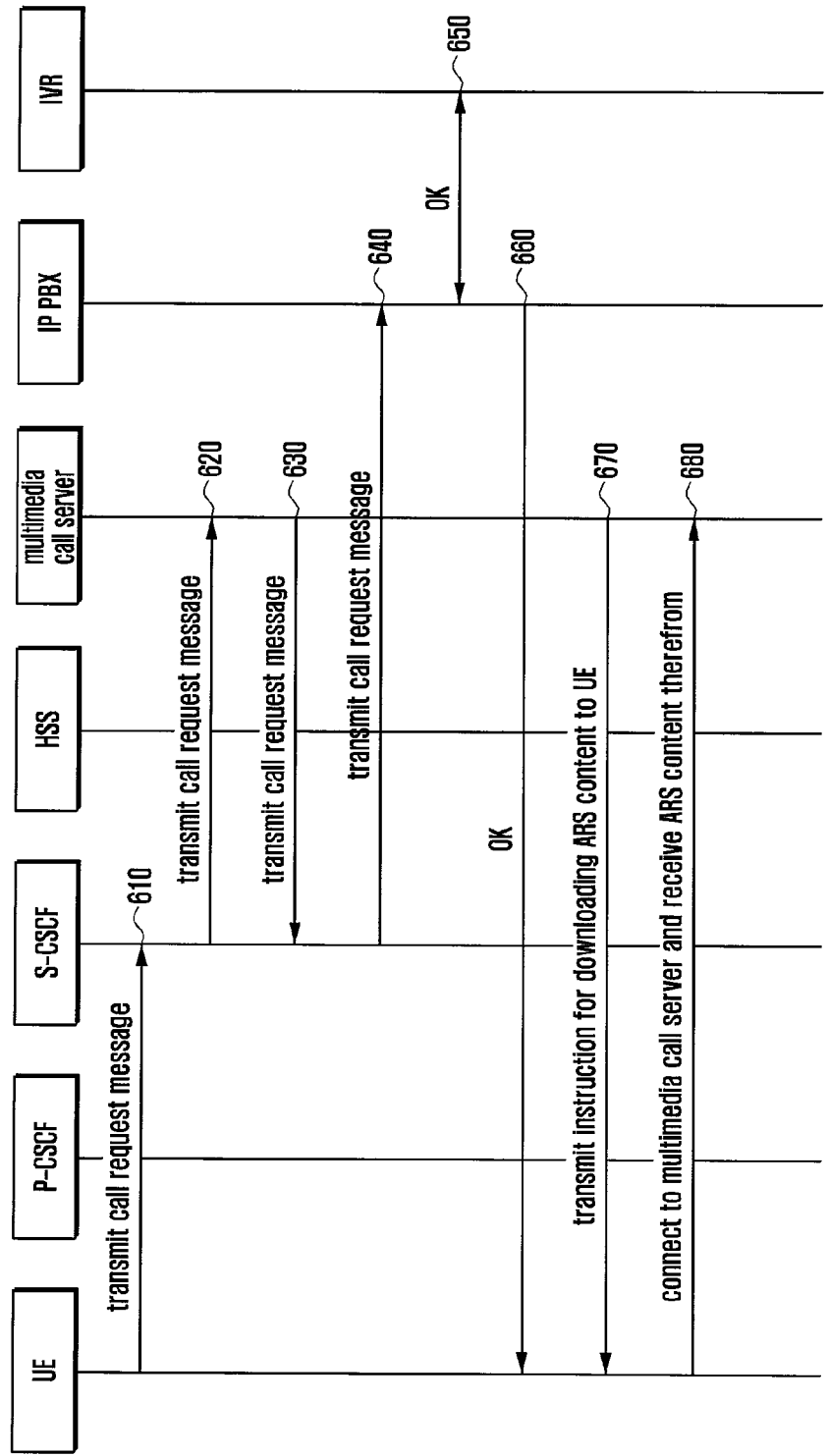
FIG. 6 is a signal flow diagram that describes a method of providing a voice-screen composite ARS service according to an embodiment of the present invention.

FIG. 6 is a signal flow diagram that describes a method of providing a voice-screen composite ARS service according to an embodiment of the present invention.

In order to use an ARS service, a user inputs a company's ARS phone number (e.g., a phone number of IVR) to the input unit 230 of UE, and makes an IMS call. UE is capable of transmitting its created, call request message (SIP INVITE request) through a Proxy-Call Session Control Function (P-CSCF) to a Serving-Call Session Control Function (S-CSCF) in operation 610. After receiving the call request message, the S-CSCF is capable of determining whether a company corresponding to the company's ARS phone number is a subscriber which provides a voice-screen composite ARS service by using a multimedia call server. For example, the S-CSCF may receive, from a Home Subscriber Server (HSS), Initial Filter Criteria (IFC) that the HSS has had through IMS registration, and then determine whether the company is a subscriber which provides a voice-screen composite ARS service.

When the S-CSCF ascertains that a company corresponding to the company's ARS phone number is a subscriber which provides a voice-screen composite ARS service, it is capable of transmitting the call request message to a multimedia call server in operation 620. When receiving the call request message from the S-CSCF, the multimedia call server is capable of determining whether ARS content corresponding to the requested, company's ARS phone number is stored in the storage unit 430. When the multimedia call server ascertains that ARS content is not stored in the storage unit 430, it is capable of requesting information regarding corresponding ARS content, e.g., the company's ARS menus, from the IVR of the company corresponding to the ARS phone number. After determining whether ARS content corresponding to the requested, company's ARS phone number is stored in the storage unit 430, the multimedia call server is capable of re-transmitting the call request message to the S-CSCF in operation 630. On the other hand, when the S-CSCF ascertains that a company corresponding to the company's ARS phone number is not a subscriber which provides a voice-screen composite ARS service, operations 620 and 630 are not performed.

When the S-CSCF receives the call request message from the multimedia call server in operation 630, it is capable of transmitting an IMS Call establishment request to an Internet Protocol-Private Branch eXchange (IP-PBX) of the company corresponding to the company's ARS phone number in operation 640. After receiving the call request message from the S-CSCF, the IP-PBX is capable of transmitting the call request message to the IVR in operation 650. When ascertaining that the call request message is successfully transmitted to the IVR, the IP-PBX transmits an OK message of a call establishment success to the UE in operation 660. When the UE receives the OK message of a call establishment success from the IVR, a vice bearer or a voice transmission path is established between the UE and the IVR.

When the multimedia call server that has received a call request message from the S-CSCF ascertains that ARS content corresponding to the requested, company's ARS phone number is stored in the storage unit 430 or when the multimedia call server has ARS content as it requests information regarding the ARS content from the IVR, it is capable of instructing the multimedia call client to download the ARS content in operation 670. The downloading instruction may be transmitted by using Session Initiation Protocol (SIP). For example, the downloading instruction may include the transmission of PUSH message via SIP MESSAGE METHOD. The embodiment of the present invention may be implemented in such a way that UE receives a PUSH message and the IMS client of UE is executed. When receiving an access instruction, the multimedia call client accesses the multimedia call server and downloads ARS content therefrom in operation 680. For example, when the multimedia call client requests HTTP access from the multimedia call server and then is authorized for HTTP access, it is capable of establishing an HTTP session with the multimedia call server and then downloading HTML-based ARS menus therefrom. When the UE has already stored an HTML file, which is the same HTML-based ARS menus and downloaded from the multimedia call server, in the storage unit 220, the ARS screen may be configured by the stored ARS content, without performing the downloading process. Although the embodiment shown in FIG. 6 is described in such a way that operations 670 and 680 are performed later than operations 620 and 630, it should be understood that the present invention is not limited thereto. For example, the embodiment may be modified in such a way that operations 670 and 680 are performed earlier than operations 620 and 630 or simultaneously performed therewith. When the call request message is transmitted not to the multimedia call server but to an IP-PBX or IVR of the company corresponding to a company's phone number, the embodiment is implemented in such a way that UE receives only a voice ARS service, without performing operations 670 and 680.

When a voice bearer is established between the UE and the IVR, the IVR is capable of transmitting ARS voice information to the UE, using Real-time Transport Protocol (RTP). Additionally, when an HTTP session is established between the UE and the multimedia call server, the multimedia call server is capable of transmitting ARS content to the UE and the UE is capable of displaying an ARS screen, etc., on the display unit. For example, when the multimedia call client downloads, from the multimedia call server, ARS content created based on at least one of the following: HTML, eXtensible Markup Language (XML) and Cascading Style Sheets (CSS), it alters the downloaded ARS content to an HTML-based ARS menu and displays the ARS menu on the screen, and may also inform the IMS client of letting the IMS client perform the output of a voice, around the time that the ARS menus starts to be displayed on the screen. In this case, in order to synchronize a voice with a video, UE is capable of having buffered the voice before displaying the video on the display unit. In order to synchronize HTML-based ARS content displayed on the screen of the UE with a voice message output from the UE, the multimedia call client is capable of comparing mapping information, recorded in metadata of the HTML file, with mapping information recorded in a field of Synchronization Source (SSRC) identifier of a RTP packet header. In another embodiment of the present invention, UE may be implemented in such a way as to have received ARS content (an HTML file related to ARS menus) via a multimedia call server before the UE establishes a voice bearer.

In addition, the HTML file may further include web content containing various links as well as a link for selecting voice menus. The embodiment may also be implemented in such a way that, when a user selects a link related to DTMF for selecting voice menus, an additional web program (e.g., Java script) is executed to transmit information that a corresponding is selected from the multimedia call client to the IMS client, and the IMS client transmits the selected menu to the IVR.

Figure 7:
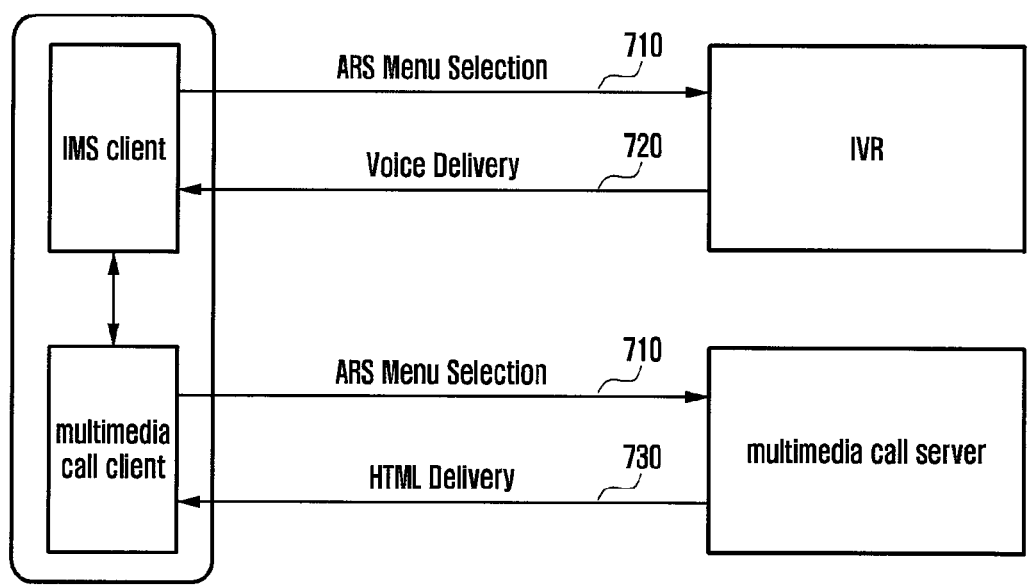
FIG. 7 is a diagram illustrating operations for synchronizing voice information with screen information according to an embodiment of the present invention.

FIG. 7 is a diagram illustrating operations for synchronizing voice information with screen information according to an embodiment of the present invention.

In a state where a voice bearer is established between the UE and the IVR and an HTTP session is also established between the UE and the multimedia call server, the user selects an ARS menu via the input unit 230 in operation 710. UE is capable of outputting a voice DTMF menu mapped one-to-one to a screen menu. In this case, the selection of menu as in operation 710 may correspond to the input of DTMF. An input for selecting a menu by a DTMF user is transmitted to the IVR by the IMS client and also to the multimedia call server by the multimedia call client. For example, the multimedia call client is capable of requesting information regarding HTML, XML ort CSS of the selected ARS menu from the multimedia call server, and the IMS client is capable of transmitting the DTMF information to the IVR.

The IVR is capable of transmitting, to the IMS client, ARS voice information in response to the menu selection, via RTP, in operation 720. The multimedia call server is capable of transmitting HTML-based screen information to the multimedia call client in operation 730. The screen information, synchronized with transmitted voice information by the UE, is played back on the display unit 230. In order to synchronize screen information with voice information, the synchronization method does not require the ARS server (IVR) and the multimedia call server to directly notify each other of menu selection.

The invention claimed is:

1. A method of providing a voice-screen composite automatic response system (ARS) service by an ARS content server comprising:
   receiving a call request message from user equipment (UE);
   determining whether ARS content corresponding to a phone number of the call request message is stored;
   instructing the UE to download the ARS content when the ARS content corresponding to the phone number of the call request message is stored; and
   transmitting the call request message via the phone number,
   wherein the ARS content and ARS voice information are output in synchronization by comparing metadata information included in the ARS content with header information included in the ARS voice information.

2. The method of claim 1, further comprising:
   requesting information regarding the ARS content from an ARS server for providing an ARS service, when the ARS content corresponding to the phone number of the call request message is not stored.

3. The method of claim 2, further comprising:
   when the information regarding the ARS content is received from the ARS server, converting the information regarding the ARS content into a form that can be displayed on the UE and storing the converted information.

4. The method of claim 1, wherein requesting access from the UE comprises:
   transmitting the call request message via session initiation protocol (SIP).

5. The method of claim 1, wherein a server for multimedia call (multimedia call server) is located in an IP multimedia subsystem (IMS) network.

6. A server for multimedia call (multimedia call server) providing a voice-screen composite automatic response system (ARS) service comprising:
   a communication unit configured to:
      receive a call request message from user equipment (UE), and
      transmit the call request message to a phone number of the call request message;
   a storage unit configured to store ARS content; and
   a controller configured to:
      determine whether the ARS content corresponding to the phone number of the call request message is stored in the storage unit; and
      control the communication unit to instruct the UE to download the ARS content when the ARS content corresponding to the phone number of the call request message is stored in the storage unit,
      wherein the ARS content and ARS voice information are output in synchronization by comparing metadata information included in the ARS content with header information included in the ARS voice information.

7. The server of claim 6, wherein the controller is further configured to request information regarding the ARS content from an ARS server for providing an ARS service when the ARS content corresponding to the phone number of the call request message is not stored in the storage unit.

8. The server of claim 7, wherein, when the communication unit receives the information regarding the ARS content from the ARS server, the storage unit is further configured to:
   convert the information regarding the ARS content into a form that can be displayed on the UE, and
   store the converted information therein.

9. The server of claim 6, wherein the communication unit is further configured to transmit a request for access to the UE via session initiation protocol (SIP).

10. The server of claim 6, wherein the multimedia call server is located in an IP multimedia subsystem (IMS) network.

11. A method of providing a voice-screen composite automatic response system (ARS) service by user equipment (UE) comprising:
   transmitting a call request message to use an ARS service;
   receiving an instruction for downloading ARS content from a server for multimedia call (multimedia call server) located in an IP multimedia subsystem (IMS) network;
   connecting to the multimedia call server to download the ARS content; and
   displaying the ARS content and playing ARS voice information in synchronization by comparing metadata information included in the ARS content with header information included in the ARS voice information.

12. The method of claim 11, further comprising:
   receiving the ARS voice information from an ARS server for providing an ARS service.

13. The method of claim 11, wherein outputting the downloaded ARS content and the ARS voice information in synchronization comprises:
buffering a voice before a video is displayed on a screen.

14. The method of claim 11, wherein the ARS content is created based on at least one of: hypertext markup language (HTML), extensible markup language (XML) and cascading style sheets (CSS).

15. A user equipment (UE) device for providing a voice-screen composite automatic response system (ARS) service comprising:
a communication unit configured to:
   transmit a call request message, and
   receive an instruction for downloading ARS content from a server for multimedia call (multimedia call server) located in an IP multimedia subsystem (IMS) network;
a controller configured to control, when receiving the instruction for downloading ARS content, the communication unit to connect to the multimedia call server, and compare metadata information included in the ARS content with header information included in ARS voice information to synchronize the ARS content with the ARS voice information; and
a display unit configured to display the ARS content, downloaded via the communication unit, synchronized with the ARS voice information received by the communication unit.

16. The UE of claim 15, further comprising:
wherein the communication unit is further configured to receive the ARS voice information from an ARS server for providing an ARS service.

17. The UE of claim 15, wherein the controller is further configured to buffer a voice before a video is displayed on a screen.

18. The UE of claim 15, wherein the ARS content is created based on at least one of: hypertext markup language (HTML), extensible markup language (XML) and cascading style sheets (CSS).

* * * * *